(12) United States Patent
Russell et al.

(10) Patent No.: US 6,375,874 B1
(45) Date of Patent: Apr. 23, 2002

(54) METHOD AND APPARATUS FOR PROTOTYPING A THREE-DIMENSIONAL OBJECT

(75) Inventors: David B. Russell, Southboro; Timothy Anderson, Cambridge; James F. Bredt, Watertown; Michael J. Vogel, Concord; Walter J. Bornhorst, Boston, all of MA (US)

(73) Assignee: Z Corporation, Somerville, MA (US)

( * ) Notice: Subject to any disclaimer, the term of this patent is extended or adjusted under 35 U.S.C. 154(b) by 0 days.

(21) Appl. No.: 09/416,787

(22) Filed: Oct. 13, 1999

Related U.S. Application Data

(63) Continuation-in-part of application No. 08/771,009, filed on Dec. 20, 1996, now Pat. No. 6,007,318.

(51) Int. Cl.[7] .............................................. B29C 31/04
(52) U.S. Cl. .................... 264/28; 264/109; 264/308; 264/113; 264/128; 425/130; 425/210; 425/215; 425/218
(58) Field of Search ................ 425/130, 218, 425/215, 210; 264/113, 109, 308, 28, 128

(56) References Cited

U.S. PATENT DOCUMENTS

| | | | |
|---|---|---|---|
| 2,775,758 A | 12/1956 | Munz | 343/17 |
| 3,428,503 A | 2/1969 | Beckerle | 156/11 |
| 4,247,508 A | 1/1981 | Housholder | 264/219 |
| 4,863,538 A | 9/1989 | Deckard | 156/62.2 |
| 4,938,816 A | 7/1990 | Beaman et al. | 156/62.2 |
| 4,944,817 A | 7/1990 | Bourell et al. | 156/62.2 |
| 5,017,753 A | 5/1991 | Deckard | 219/121.63 |
| 5,053,090 A | 10/1991 | Beaman et al. | 156/62.2 |
| 5,076,869 A | 12/1991 | Bourell et al. | 156/62.2 |
| 5,088,047 A | 2/1992 | Bynum | 364/474.24 |
| 5,127,037 A | 6/1992 | Bynum | 378/4 |
| 5,132,143 A | 7/1992 | Deckard | 427/197 |
| 5,155,321 A | 10/1992 | Grube et al. | 219/121.6 |
| 5,155,324 A | 10/1992 | Deckard et al. | 219/121.64 |
| 5,204,055 A | 4/1993 | Sachs et al. | 419/2 |
| 5,252,264 A | 10/1993 | Forderhase et al. | 264/22 |
| 5,296,062 A | 3/1994 | Bourell et al. | 156/62.2 |
| 5,316,580 A | 5/1994 | Deckard | 118/110 |
| 5,340,656 A | 8/1994 | Sachs et al. | 428/546 |
| 5,342,919 A | 8/1994 | Dickens, Jr. et al. | 528/323 |
| 5,352,405 A | 10/1994 | Beaman et al. | 419/45 |
| 5,382,308 A | 1/1995 | Bourell et al. | 156/62.2 |
| 5,387,380 A | 2/1995 | Cima et al. | 264/69 |
| 5,490,882 A | 2/1996 | Sachs et al. | 134/1 |
| 6,007,318 A | 12/1999 | Russell et al. | 425/130 |

FOREIGN PATENT DOCUMENTS

| | | |
|---|---|---|
| DE | 4417083 A1 | 11/1995 |
| EP | 0431924 A2 | 6/1991 |
| WO | WO 92/08592 | 5/1992 |
| WO | WO 92/19112 | 9/1994 |
| WO | WO 94/26446 | 11/1994 |
| WO | WO 95/34468 | 12/1995 |
| WO | WO 97/28955 | 8/1997 |
| WO | WO 98/51477 | 11/1998 |

OTHER PUBLICATIONS

Sanders Prototype, Inc., Modelmaker II System, The high precision 3D modeling system (http://www.sanders–prototype.com/mmii/mmii.htm) (consisting of 8 pages).

(List continued on next page.)

Primary Examiner—Mary Lynn Theisen
(74) Attorney, Agent, or Firm—Hamilton, Brook, Smith & Reynolds, P.C.

(57) ABSTRACT

A printer forms three-dimensional objects from a powder by selectively applying a binder liquid to incremental layers of the powder. The binder binds layers of the powder into solid two-dimensional cross sections of the desired object provided from memory. The printer can use dithering and halftoning techniques to shade the object and can also print in color. A filtration system removes airborne powder and recirculates the clean air. The printer also includes additional features to manage excess and airborne powder.

51 Claims, 11 Drawing Sheets

OTHER PUBLICATIONS

Sanders Prototype, Inc., Sanders Prototype "MM–6PRO" System (http://www.sanders–prototype.com/mm6pro.htm) (consisting of 4 pages).

Technology International Incorporated of Virginia, SBIR 95–1 Solicitation Project Summary (http:/sbir/gsfc.nasa.gov/95abstracts/08.07/951020.html) (consisting of 1 page).

Sanders Prototype, Inc., Model–Maker Desktop 3D Modeling System (http:///www.sanders–prototype.com/datasht.htm) (consisting of 4 pages).

Sanders Prototype, Inc., SPI Model Maker™ 3D Modeling System Technical Description (http://www.sanders–prototype.com/techdesc.htm) (consisting of 3 pages).

Sanders Prototype Inc., Sanders Prototype Incorporated Application Notes, (http://www.sanders–prototype.com/appnotes.htm) (consisting of 2 pages).

U.S. application No. 08/707,693, Bredt et al., filed Sep. 4, 1996.

METHOD AND APPARATUS FOR PROTOTYPING A THREE-DIMENSIONAL OBJECT

RELATED APPLICATION

This application is a Continuation-in-Part of U.S. application Ser. No. 08/771,009, filed Dec. 20, 1996, now U.S. Pat. No. 6,007,318 the entire teachings of which are incorporated herein by reference.

BACKGROUND OF THE INVENTION

Rapid prototyping describes various techniques for fabricating a three-dimensional prototype of an object from a computer model of the object. One technique is three-dimensional printing whereby a special printer is used to fabricate the prototype from a plurality of two-dimensional layers. In particular, a digital representation of a 3-D object is stored in a computer memory. Computer software sections the representation of the object into a plurality of distinct 2-D layers. A 3-D printer then fabricates a layer of material for each layer sectioned by the software. Together, the various fabricated layers form the desired prototype.

In one method of three-dimensional printing, layers of a powder material are deposited in a confined area. A binder solution is selectively deposited on each layer to produce regions of bound powder. The unbound powder is then removed to yield a three-dimensional part.

SUMMARY OF THE INVENTION

In accordance with the invention, a three-dimensional printer fabricates a three-dimensional object from a digital representation stored in memory. In a particular embodiment, the digital representation is provided from memory by a computer. One or more mechanisms may be employed with the printer to enhance or improve the quality of the fabricated object.

In particular, a work area of the printer includes a feed reservoir, a build table, an overflow cavity and a fabrication assembly. Build material is stored in the feed reservoir in a powdered form and is extracted as required to build the three-dimensional object. The build table receives an incremental deposit of build powder transferred from the feed reservoir. The build powder can reacts with an applicable binder to form a solid region. Excess build powder which is not deposited on the build table can be received at the overflow cavity. During fabrication, airborne build material can be created in the work area. A flow of air across each layer of build powder during printing reduces the drying time for the binder to improve the print quality.

In a particular embodiment, a filtration system, which may include a vacuum pump and a filter, can be coupled to the overflow cavity to remove excess build powder from the overflow cavity. The filtration system can also include a dehumidifying element to remove excess moisture from the air. The filtration system can draw air from the overflow cavity during operation of the printer. The user can select to divert the suction to an inlet to act as a moveable, miniature vacuum cleaner.

The filtration system can recirculate the filtered, dehumidified air from the work area to a clean area of the printer. The clean area can include electronics and other equipment damageable by the airborne build material. A partial seal can be employed to separate the work area from the clean area and a mechanical coupling can extend through the partial seal to operate the fabrication assembly. A positive pressure differential helps to keep airborne powder out of the clean area.

Binder liquid can be applied by a moveable gantry suspended over the feed reservoir, the build table and the overflow cavity. The gantry can also include a spreader for transferring build material from the feed reservoir to the build table to create incremental layers. The gantry includes binder jets in at least one binder cartridge, each binder jet being coupled to a supply of binder to selectively deposit binder on the layers of build material. In a particular embodiment, the binder cartridges are operated with pressure-controlled binder solution.

Varied volumes of binder can be applied to selected positions in the layers of build material. By applying these varying quantities of binder, the strength of the part can be controlled. In particular, a greater volume of binder is deposited at the perimeter of the cross-section to create a hard outer shell or in the interior of the cross-section to create a truss or other support structure. Varying volumes can be deposited by varying the flow rate of the binder from the jets or by depositing binder a variable number of times at a selected position.

The binder can include color dyes. Drops of binder and dyes can be selectively deposited on a layer of build material to create a multi-colored object. In particular, the dyes can be selectively deposited to color the outside surface of the object. The binder itself can be uncolored or combined with the dyes.

During operation, the binder jets can be clogged by debris, including a mixture of the binder and the build material. A cleaning assembly on the gantry can include a wiper membrane to remove build material and other debris from the binder jets. In particular, a wiper element is provided in a path from the binder jets. The binder jets are periodically directed to travel across the wiper element so the wiper element can dislodge residue from the jets. The wiper element can be cleaned by flowing binder material from the jets over the wiper element to clean the wiper element. The resulting waste liquid can be collected for disposal in a waste container.

For a number of reasons, including clogging and misalignment, a particular binder jet in a print cartridge may become faulty. The faulty jet can create an undesired line of delamination in each layer of build material. To address this problem, the binder jets can be offset by a fixed distance between successive layers. This offsetting creates a discontinuity between the lines of delamination. This shingling effect is created by laterally offsetting the binder jets relative to the direction of a print scan.

Any of a number of post-processing mechanisms or techniques may be used to improve the quality of the fabricated objected. These can include infiltration and coatings.

The feed reservoir and the build chamber are piston chambers or boxes, which can be fabricated from a unitary material. The piston boxes include sides which join each adjacent side at a curved interior corner. A piston is chosen to have a shape which compliments the interior shape of the box. A seal is provided between the outside edges of the piston and the interior surface of the box to retain the build material over the pistons. The box can be formed by shaping a flexible metal belt to form a smooth interior surface. The curved interior corners are formed by wrapping the belt around a plurality of rods to define the corners. The belt is then fixed in place by a volume of curable urethane and, after curing, the rods are removed to yield a piston box having a smooth interior surface.

The above and other features including various novel details of construction and combination of parts, will be more particularly described with reference to the accompanying drawings and pointed out in the claims. It will be understood that the particular method and apparatus for prototyping a three-dimensional object embodying the invention is shown by illustration only and not as a limitation of the invention. The principal and features of this invention may be embodied in varied and numerous embodiments without departing from the scope of the invention.

DETAILED DESCRIPTION OF EMBODIMENTS

Figure 1:
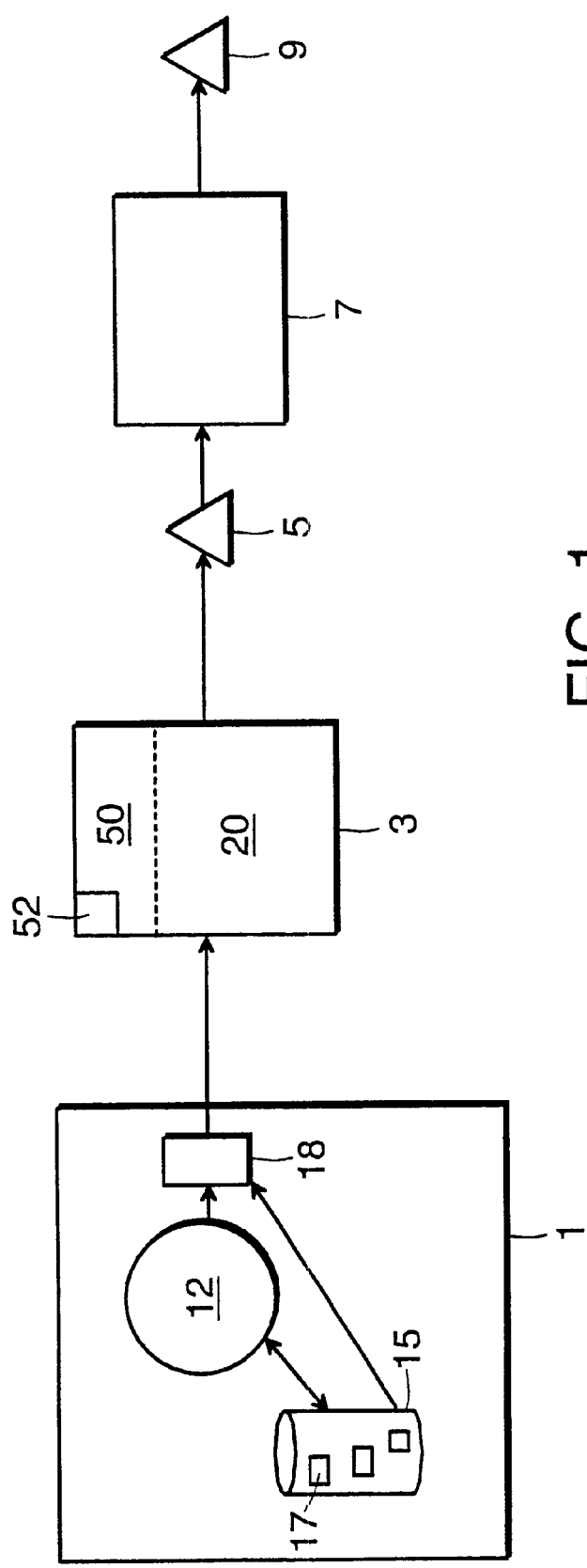
FIG. 1 is a schematic diagram of an apparatus for rapid prototyping.

FIG. 1 is a schematic diagram of an apparatus for rapid prototyping. As illustrated, there is a computer 1, a three-dimensional printer 3, a formed 3-D printer object 5, a postprocessing system 7 and a post-processed 3-D prototype object 9.

The computer 1 can be a personal computer, such as a desktop computer or a portable computer. The computer 1 can be a stand-alone computer or a part of a Local Area Network (LAN) or a Wide Area Network (WAN). In accordance with the invention, the computer 1 includes a software application 12, such as a Computer Aided Design (CAD)/Computer Aided Manufacturing (CAM) program. The CAD/CAM program 12 manipulates digital representations of three-dimensional objects 17 stored in a data storage area 15. The CAD/CAM program 12 can create, modify and retrieve the stored representations 17. When a user desires to fabricate a prototype object 9 of the stored object representation 17, the user exports the stored representation to a high-level software program 18. From the high-level program 18, the user then instructs the program 18 to print. The program 18 sections the digital representation 17 into a plurality of discrete two-dimensional layers, each of a predetermined thickness.

The program 18 prints each layer by sending high-level instructions to control electronics 52 in the printer 3, which operates the three-dimensional printer 3. Alternatively, the digital representation of the object 17 can be directly read from a computer-readable medium (e.g., magnetic or optical disk) by printer hardware. The three-dimensional printer 3 includes a dirty area 20 where the printing is performed and a clean area 50 where control electronics 52 are housed.

The three-dimensional printer 3 uses an ink jet type print cartridge to deposit binder solution from the ink jets onto successive layers of a powdered build material, such as disclosed in U.S. Pat. No. 5,902,441 to Bredt, et al., the teachings of which are incorporated herein by reference in their entirety. Where the binder combines with the build powder, the powder reacts and cures into a solid structure. By controlling the placement of binder droplets from these binder jets, the solid structure of the 2-D cross section can be physically reproduced. The three-dimensional printer 3 fabricates a physical layer for each sectioned layer provided by the program 18. When the file has been completely printed, an unfinished three-dimensional part 5 is formed. Further details of binding a powder to form an object are disclosed in U.S. Pat. Nos. 5,340,656 to Sachs et al. and 5,387,380 to Cima et al., the teachings of which are incorporated herein by reference in their entirety. To improve quality, each layer of build material can be exposed to an air flow, which improves spreading by reducing airborne particles and improves drying of the deposited binder solution.

The post-processing system 7 may be used to finish the prototype object 9 from the printed part 5. Various finishing options are available depending on the result to be achieved. Specific options will be described in more detail below.

A particular embodiment of the invention is commercially available from Z Corporation of Somerville, Mass. as its Z402™ rapid prototyping system.

AIR FLOW

Air can be circulated throughout the machine to maintain a humidity controlled environment and to solve a variety of problems. One major problem is airborne powder, which can cause reliability problems. Airborne powder can get into the binder jets and thereby cause them to clog and hinder printing. Also, the powder can cause damage to the printer electronics and other sensitive hardware. Finally, loose powder can be released into the environment when a top enclosure covering the printer is open, thereby causing an annoyance to the user.

Figure 2:
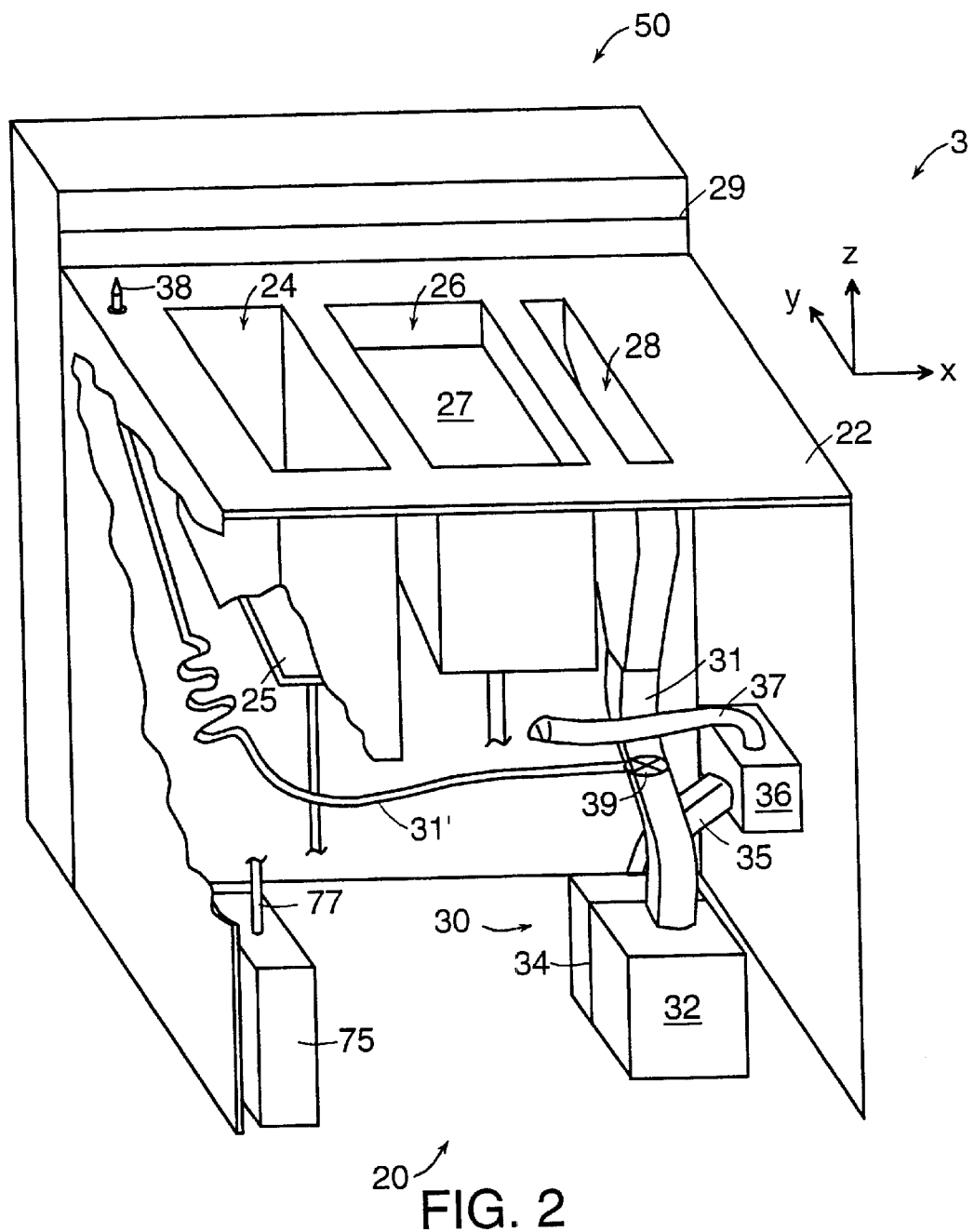
FIG. 2 is a perspective view of the basic elements for regulating airflow through the three-dimensional printer of FIG. 1.

FIG. 2 is a perspective view of the basic elements for regulating airflow through the three-dimensional printer 3 of FIG. 1. As illustrated, the three-dimensional printer 3 includes a top deck 22 having a plurality of depressed cavities. Illustrated along the x-axis are a rectangular feed reservoir 24 having a bottom feed piston 25, a rectangular build chamber 26 having a bottom build piston defining a build table 27, and a funnel-shaped overflow cavity 28. Although omitted from the drawing for clarity, a seal is fixed to the pistons 25,27 and is slidable against the interior walls of the piston boxes 24,26. Although also not illustrated, a top cover isolates the printing area from the outside environment.

The overflow cavity 28 is shown connected to an air filtration and conditioning system 30. A vacuum pump 34 draws air from the overflow cavity 28 through an inflow conduit 31 into a filter chamber 32. Foreign matter is extracted from the air by the filter chamber 32, such as through a collection bag and filter arrangement. The filtered air from the vacuum pump 34 is provided by a filter conduit 35 to a desiccant cartridge 36 to control the humidity of the filtered air. The dehumidified filtered air is provided by an outflow conduit 37 to a port leading to the clean area 50.

In addition to capturing excess powder, the airflow through the overflow cavity 28 reduces the amount of airborne powder to facilitate machine reliability and user satisfaction.

The airflow through the overflow cavity 28 can be shutoff by the user pressing a button or operating a switch (not shown) which closes a valve 39. Suction is shown diverted to an alternative inflow tube 31' which terminates at an inlet 38 which can be extended and manipulated by the user as a miniature vacuum cleaner to vacuum excess, unbound powder from in and around the build chamber 26 once the building of the part 5 is complete. To facilitate this cleaning process, the alternative inflow tube 31' is of a smaller diameter than the inflow conduit 31 so the airflow automatically jumps to a much higher velocity when this miniature vacuum 38 is being used. The airflow returns to its lower level when the user switches the valve 39 back to generate flow from the overflow cavity 38. The valve 39 can automatically switch to the overflow cavity 28 when building recommences.

Figure 3:
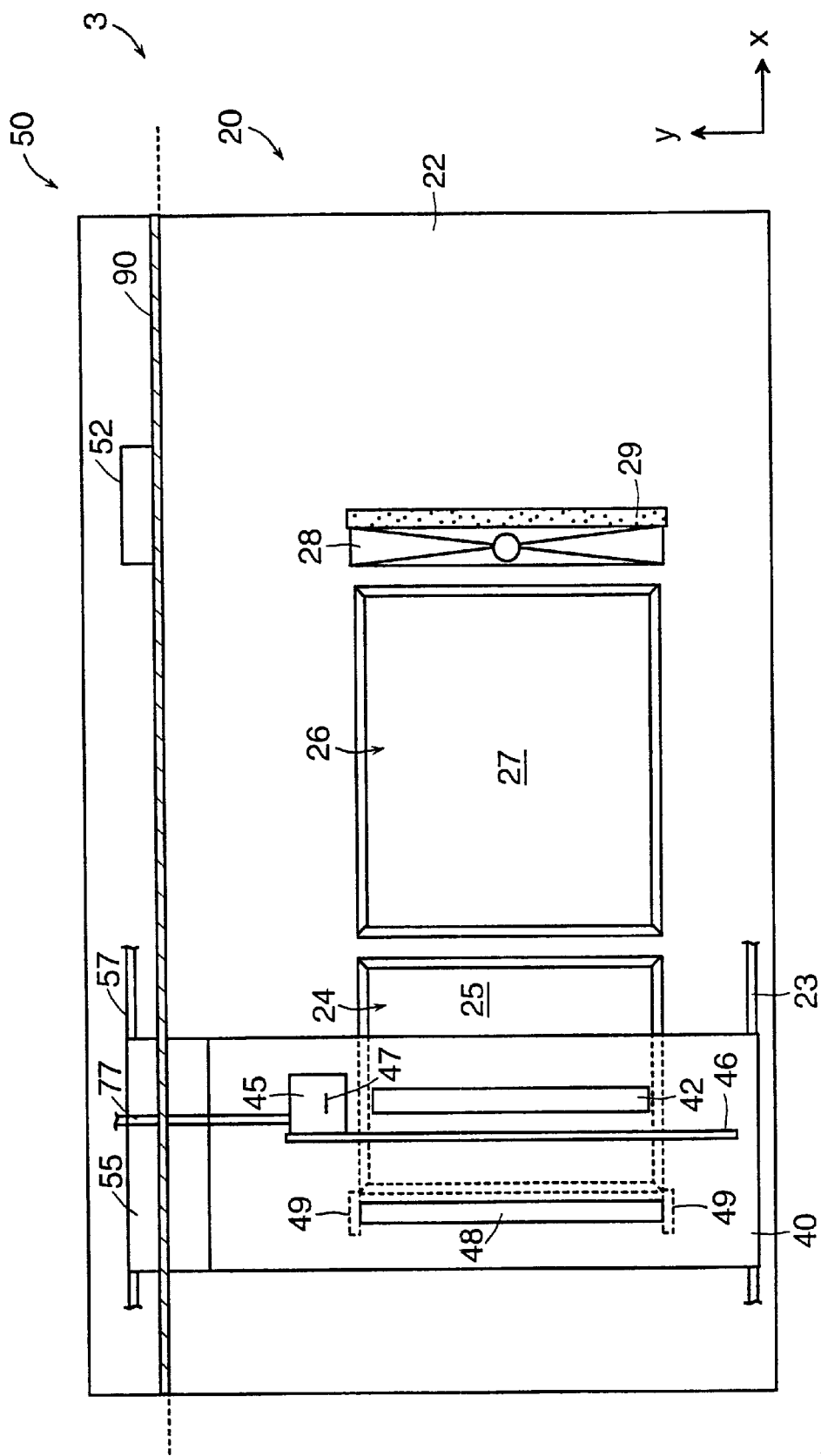
FIG. 3 is a top side view of the three-dimensional printer of FIG. 1.

FIG. 3 is a top view of the three-dimensional printer 3 of FIG. 1. Shown in more detail are the dirty area 20 and the rear clean area 50, with both tops removed. The top deck 22, in addition to the three boxes 24, 26, 28 includes an abrasive section 29 discussed below. A print gantry 40 is suspended over the top deck 22 by an arm assembly 55 connected to a track 57 and a support rod 23. During operation, the arm moves along the x-axis on the track 57 and the support rod 23 to move the gantry 40.

The dirty area 20 is shown separated from the clean area 50 by a sliding seal 90 through which the arm assembly 55 extends. The sliding seal may be a slit formed in a plastic sheet. The operational electronics 52 are located in the clean area 50. Because of a pressure differential between the dirty area 20 and the clean area 50, airflows from the clean area 50 through the sliding seal 90 into the dirty area 20. This positive pressure differential is maintained to keep powder particles and dust out of the clean area 50. This airflow into the clean area 50 from the airflow system 30 also helps to cool the electronics 52.

As illustrated, the gantry 40 includes a print slot 42 which defines a printable area, and a binder cartridge 45. The binder cartridge 45 reciprocates in the y-axis along a print track 46. During printing, the y-axis is a faster print axis than the x-axis of the gantry movement. The gantry 40 preferably includes at least one ink jet print cartridge 45, each having a plurality of binder jets for depositing a binder liquid. The binder jets receive binder solution from a binder reservoir 75 (FIG. 2) through at least one binder conduit 77. Also illustrated is a spreader roller 48 for dispersing build powder from the feed reservoir 24 to the build chamber 26.

Figure 4:
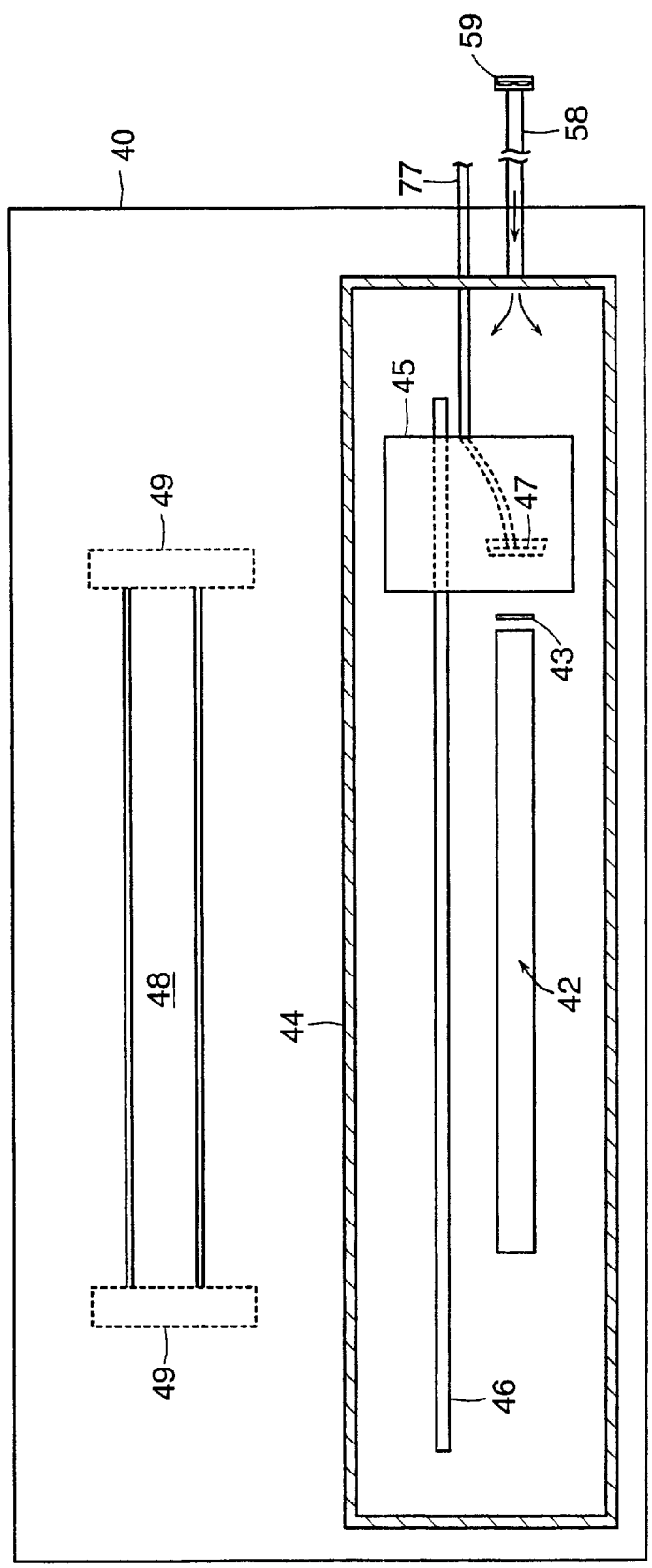
FIG. 4 is an enlarged schematic diagram of the print gantry of FIG. 3.

FIG. 4 is an enlarged schematic diagram of the print gantry 40 of FIG. 3. Illustrated are a row of binder jets 47 in the cartridge 45. Included is a jet wiper 43, for example, a flexible rubber blade, which removes residue from the binder jets 47 during each reciprocation cycle. Also shown is an enclosure 44 over the scan area of the printer cartridge 45. The roller 48 is flanked by two plow members 49 which cooperate to prevent an accumulation of excess print medium from the edges of the feed reservoir 24 and the build cavity 26, as described in more detail below.

In the particular embodiment shown, air can flow from the clean area 50 to the cartridge enclosure 44 through an air tube 58. A positive airflow can be matched by the pressure differential between the clean area 50 and the dirty area 20, although a fan 59 placed on the clean area 50 can be used to assist the airflow out of the cartridge enclosure 44 to provide a positive pressure and thereby hinder powder from entering the enclosure 44. This hinders airborne powder, resulting from the impact of the liquid binder hitting the powder, from traveling onto the binder jets and thereby clogging them.

Airflow can also be used to accelerate binder drying. By flowing air over each printed layer on the build table 27, the deposited binder can be more thoroughly dried before spreading the next layer of powder. The air can be heated, but that is not required.

PRINTING

FIGS. 5A–5D are schematic diagrams illustrating a process for handling the build powder. Illustrated are the feed reservoir 24, the build chamber 26 and the overflow cavity 28 depressed in the top deck 22. A supply of build powder 60 is supported in the feed reservoir 24 by the movable feed piston 25 and the build table 27 is shown within the build chamber 26. As known in the art, the feed piston 25 moves incrementally upward in the z-axis during operation, while the build table 27 moves incrementally downward in the z-axis. A constant airflow down the overflow cavity 28 is created by the vacuum pump 34 (FIG. 2).

Figure 5A:
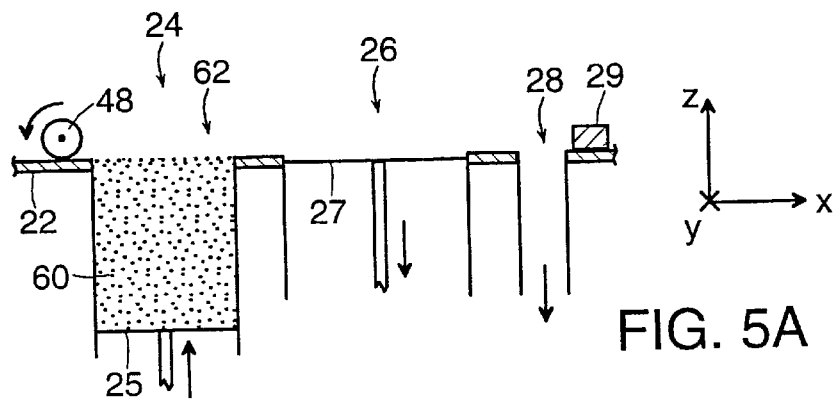
FIGS. 5A–5D are schematic diagrams of a process for controlling print medium.

Referring to FIG. 5A, the floor 25 of the feed reservoir 24 has been positioned such that a sufficient quantity 62 of build material 60 for one layer protrudes above the feed reservoir 24. The build table 27 has been positioned to a specific depth to receive a first layer of build material. Preferably, the build table 27 is incrementally lowered to create a plurality of successive build layers, each about 5–9 mils thick or less.

Figure 5B:
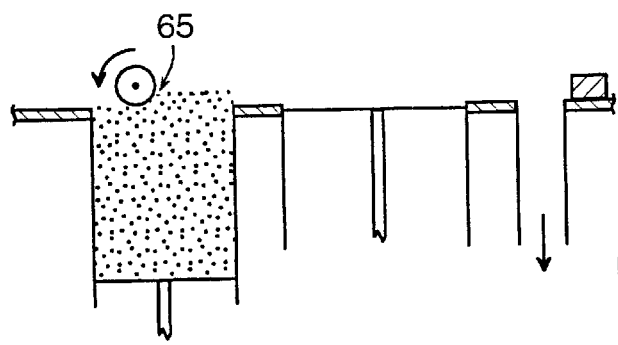
Figure 5C:
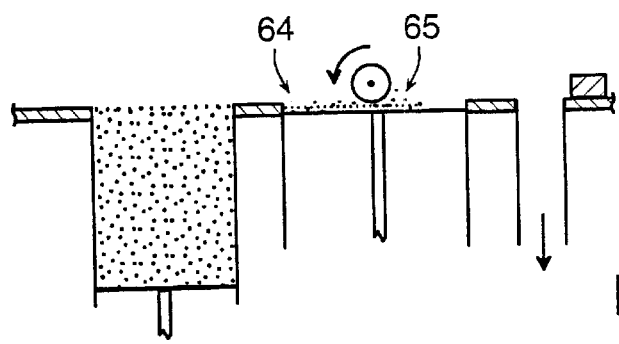
Figure 5D:
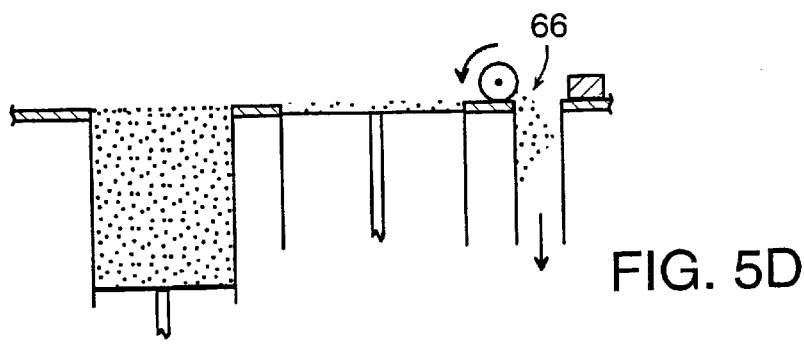

Referring to FIG. 5B, the roller is rotated counter to its forward motion to push the quantity of build material 62 forward toward the build chamber 26. As illustrated in FIG. 5C, the roller 48 continues across the build chamber 26 to deposit a finite layer of build material 64 onto the build table 27. To assure that a full build layer is deposited on the build table 27, an excess amount of build material 60 is provided by and removed from the feed reservoir 24. This excess build material 66 is dumped by the roller 48 into the overflow cavity 28 where the airflow carries the particles to the filtration system 30 (FIG. 2).

At least a portion of the gantry 40 also passes over the overflow cavity 28 to clean debris from the bottom of the gantry 40. A crusted layer is typically generated on the front bottom of the gantry as a result of airborne powder mixing with the binder material. This layer tends to become thick over time and drags on the powder bed causing indentations on the top layer of the powder bed and leading to flaws in the final part. Small brushes, loop material (e.g., Velcro® fastener material) or another abrasive 29 are placed on top of the top deck 22 to scrape excess debris from the bottom of the gantry. This debris can then be drawn down the overflow cavity 28 when the leading edge of the gantry 40 passes over it.

Having layed a current layer with movement of the gantry in the x-direction, the 2-D cross-section of that layer is printed. In particular, the printing occurs during successive passes of the print cartridge in the y-direction during the reverse pass of the gantry in the negative x-direction. Other printing methods can be used instead, as described in detail below.

As noted, the spreader roller 48, attached to the gantry, picks up powder 62 from the top of the feed piston 25 and spreads it onto the top of the build table 27 in the build chamber 26. By moving the powder 62 over such distances, this process is potentially the one to cause the most airborne powder.

As the build material is being spread, a wave of powder 65 results and tends to move laterally relative to the roller's direction of motion. The plows 49 (FIG. 4) tend to contain the wave of powder 65. This prevents build material from spilling over onto the top deck 22 and forming a pile, which is undesirable from the standpoint of machine reliability and user satisfaction. The plows 49 form a seal against the ends of rotating and translating spreader roller 48 and against the top of the top deck 22. Springs are preferably utilized to generate an inward force on the plows 49 toward each other, causing the plows 49 to form a tight seal with the spreader roller 48. The springs also generate a downward force on the plows 49 to form a seal with the top of the top deck 22.

The plows 49 can be fabricated from an oil-filled plastic material to reduce the friction between the bottom of the plows 49 and the top of the top deck 22 during powder spreading. The oil-filled material also forms a barrier which prevents powder from sticking to the bottom of the plows 49. In addition, the oil-filled material may also provide a self-replenishing release layer.

As the spread roller 48 pushes the wave of powder 65, there is an accumulation of powder on the leading edge which gets pushed sideways onto the area in front of the plows 49. This powder is pushed along by the plows 49 until it is finally drawn or dropped into the overflow cavity 28 or piled out of the way. The overflow cavity 28 can be wider than the feed reservoir 24 and build chamber 26 openings to capture this powder.

The impact of the binder hitting the powder layer during binding causes powder to fly up and hit the bottom of the binder cartridge. Because the cartridge is wet with binder, the powder can then harden and form a crust on the bottom of the cartridge or it could possibly eventually get inside the jets, thereby clogging the outlet of the jets. In addition, excess binder occasionally forms a droplet which rests on the bottom of the cartridge and remains there as a result of surface tension. This can also cause clogging of the outlet of the jets or deflection of the jets. When jets are clogged, the binder is not deposited where desired, thereby causing faults in the final part. Therefore, a method is desired to clean the powder or binder from the bottom of the cartridge after the laying of each layer of powder to keep the jet outlets open.

Returning to FIG. 4, a thin membrane 43, such as a squeegee, is located on the gantry outside the print slot 42 and the piston boxes 24,26. The cartridge passes over the squeegee to cause any powder and binder to be scraped off the jet outlets. The problem then remains as to how to clean the squeegee 43 and remove the powder and binder from this area.

One method of cleaning the squeegee area is to squirt a cleaning solution from a proximally located cleaning nozzle onto the squeegee 43. This solution then drains, with debris, down a waste tube and into a waste container. Another method is to fire the jets so the binder material acts as a cleaning solution to rinse the debris off the squeegee 43 and down the waste tube into the waste container.

PRINT SPEED AND PART QUALITY

Maximizing build speed is of great interest to the user. The build time has two primary components: the spreading of the powder and the depositing of the binder liquid. The rate of spreading powder is limited by several factors, including the need to maintain a smooth top layer and to minimize airborne powder. Therefore, one method of increasing the build rate is to increase the rate of binder deposition. A method to increase the speed of depositing binder includes using multiple binder cartridges.

Figure 6:
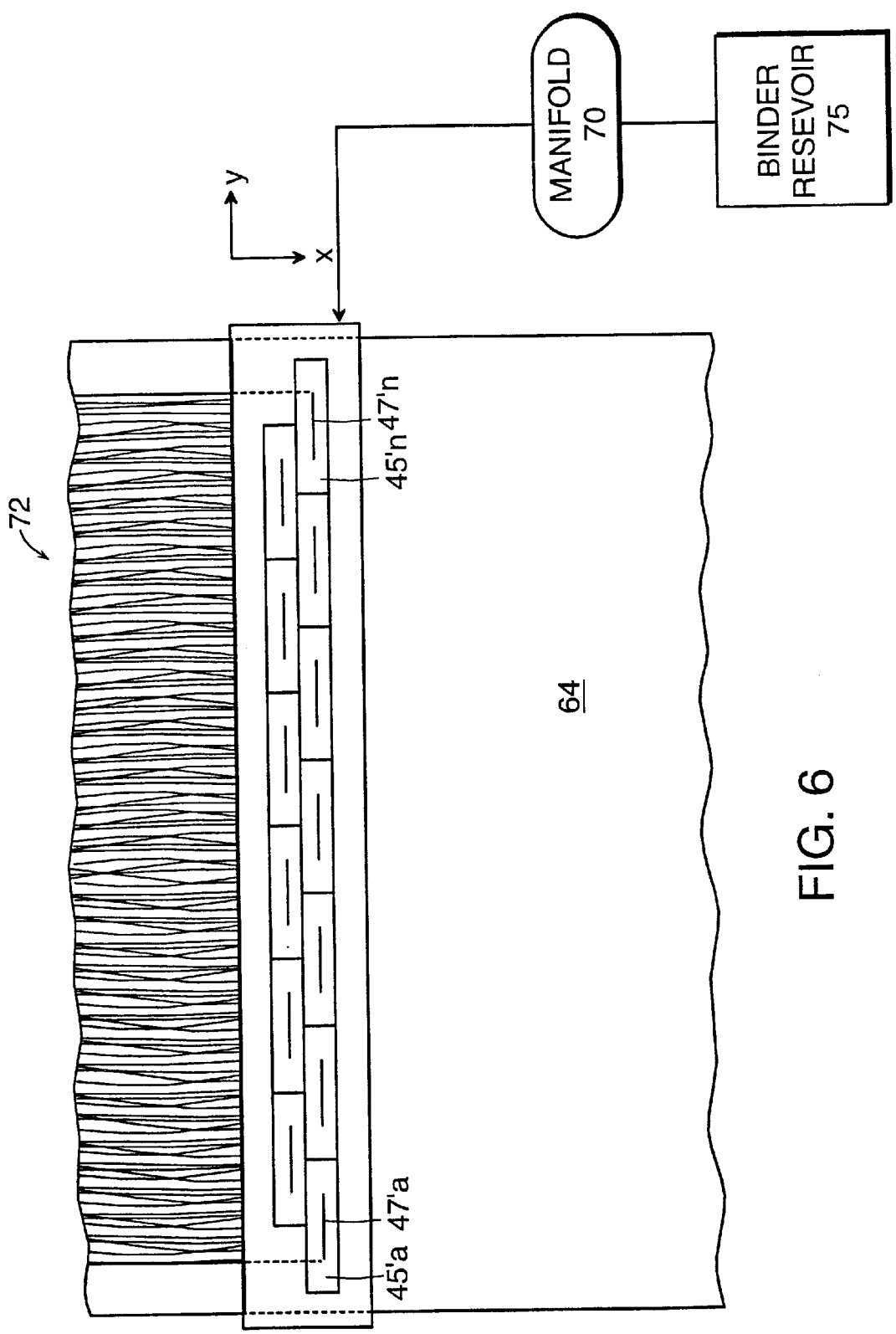
FIG. 6 is a schematic diagram of an apparatus employing multiple binder cartridges.

FIG. 6 is a schematic diagram of an apparatus employing multiple binder cartridges. When employing multiple cartridges, the cartridges are placed at 90° relative to the single cartridge embodiment described above. That is, printing now occurs along the x-axis as the gantry 40 is moved. Because each cartridge 45′a, . . . ,45′n is wider than the area occupied by the binder jets 47′a, . . . ,47′n, the cartridges 45′a, . . . ,45′n are arranged in a special manner to be able to deposit the binder liquid over the entire surface area of the top powder layer in the build chamber 26. If the cartridges 45′a, . . . ,45′n are simply placed side-by-side, there may be areas in which the cartridges 45′a, . . . ,45′n cannot deposit binder.

As illustrated, one method of arranging the cartridges 45′a, . . . ,45′n to provide a binding capability over a full print area 72 is to arrange the cartridges 45′a,. . .,45′n in several rows in the x-axis so the cartridges 45′a, . . . ,45′n overlap to form a continuous sequence of binder jets 47′a, . . . ,47′n along the y-axis. There is, therefore, no movement or reciprocation of any cartridge in y-axis direction during binding deposition in contrast to the single cartridge system. Binder can be supplied to each of the jets in each cartridge through a manifold 70 from a common reservoir 75.

Figure 7:
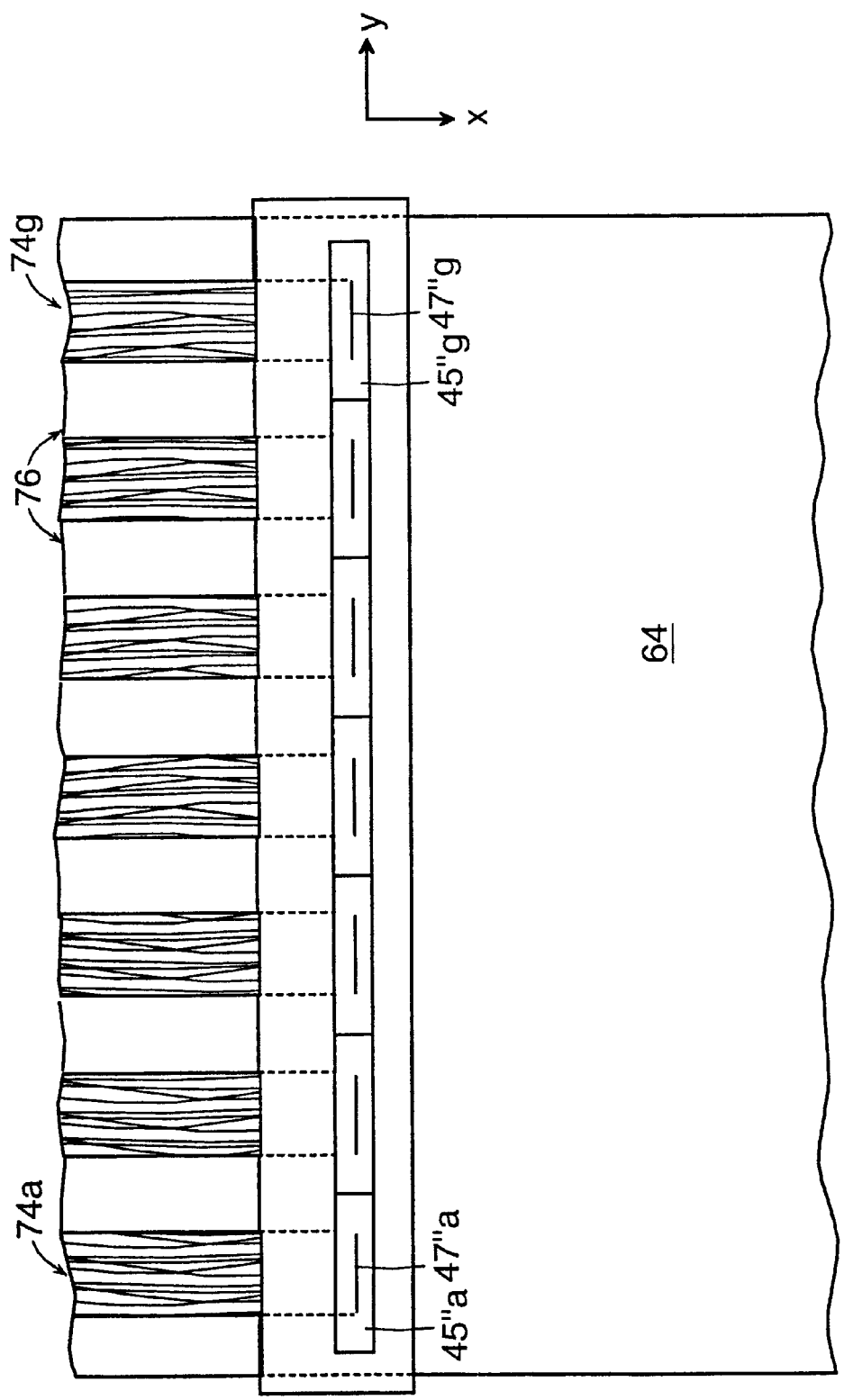
FIG. 7 is a schematic diagram of another apparatus employing multiple binder cartridges.

FIG. 7 is a schematic diagram of another apparatus employing multiple binder cartridges. As illustrated, a plurality of binder cartridges 45″a, . . . ,45″g are arranged side-by-side and then binder is deposited in two directions. That is, portions of the build area 74a, . . . ,74g can be covered with binder as the cartridges 45″a, . . . ,45″g move in the negative x direction, thereby binding a row of stripes. The cartridges 45″a, . . . ,45″g are then indexed in the y direction by the length of the jet array 47″a, . . . ,47″g. Another portion of the printable area 76 can be covered with binder upon the return of the cartridges 45″a, . . . ,45″g in the positive x direction. This can be repeated as many times as necessary to cover the entire print area. If the last stroke is in the positive x direction, then printing occurs just ahead of spreading.

An advantage of this technique is that there are no extra strokes and therefore there is no penalty in binding speed in using this method. A possible disadvantage of this method is that the powder that becomes airborne as a result of spreading can get into the jets and cause reliability problems with deposit of the binder.

If the last stroke is in the positive x direction, then the gantry 40 returns to the feed reservoir 24 prior to spreading powder. Another method to deposit binder in two directions is for the gantry to bind in two strokes, return to the feed reservoir 24 and then spread powder. This has a possible disadvantage of requiring an additional number of strokes. This method, however, offers an advantage in that powder which becomes airborne as a result of spreading does not interfere with the depositing of binder. Alternatively, printing can be done in one direction only for all or just for the last two printing strokes.

Figure 8:
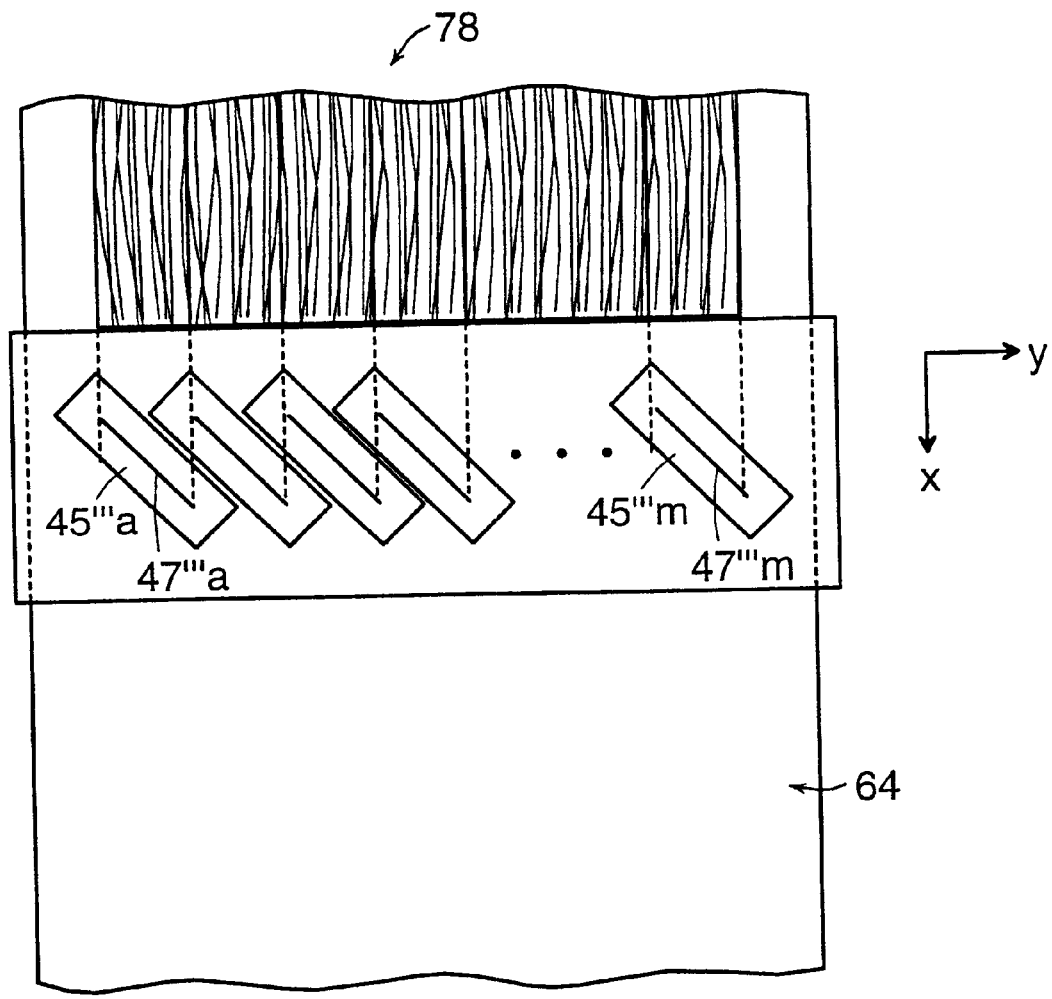
FIG. 8 is a schematic diagram of yet another apparatus employing multiple binder cartridges.

FIG. 8 is a schematic diagram of yet another apparatus employing multiple binder cartridges. As illustrated, binder cartridges 45′′′a, . . . ,45′′′m are arranged side-by-side at angles of, for example, 45° relative to the x-axis. As such, the binder jets 47′′′a, . . . ,47′′′m are arranged in a continuous line along the y-axis to print a continuous print area 78. An advantage of this method is that printing can be done in one stroke or a minimal number of strokes, depending on the head geometry.

One of ordinary skill in the art would recognize many variations to the methods described above to optimize various parameters. For example, the heads could be at an angle and print in two directions, one stripe in each direction.

It is desired to achieve consistently high part strength despite various problems with the printing of particular jets. For example, occasionally certain jets in the binder cartridge may not be firing or the firing may be flickered as a result of a head that is manufactured poorly or one that has become contaminated by powder.

Figure 9:
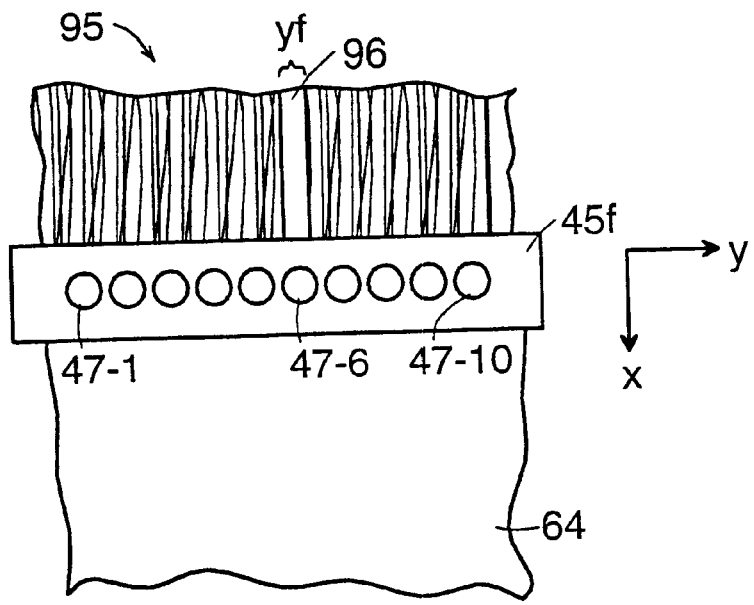
FIG. 9 is a schematic diagram of a binder cartridge having a faulty binder jet.

FIG. 9 is a schematic diagram of a binder cartridge having a faulty binder jet. As illustrated, the cartridge 45 is one of a plurality of cartridges which print along the x-axis as the gantry 40 (FIG. 3) moves. If a particular jet 47-6 of a cartridge 45 does not fire, then a stripe 96 may appear in the x direction on the particular layer of binder that is being printed 64. This creates an undesired discontinuity in the printed area 95. The problem is that this vertical strip of unbound powder 96 is at the same y location $y_f$ on each layer, thereby causing a plane of delamination once the part is complete.

Figure 10:
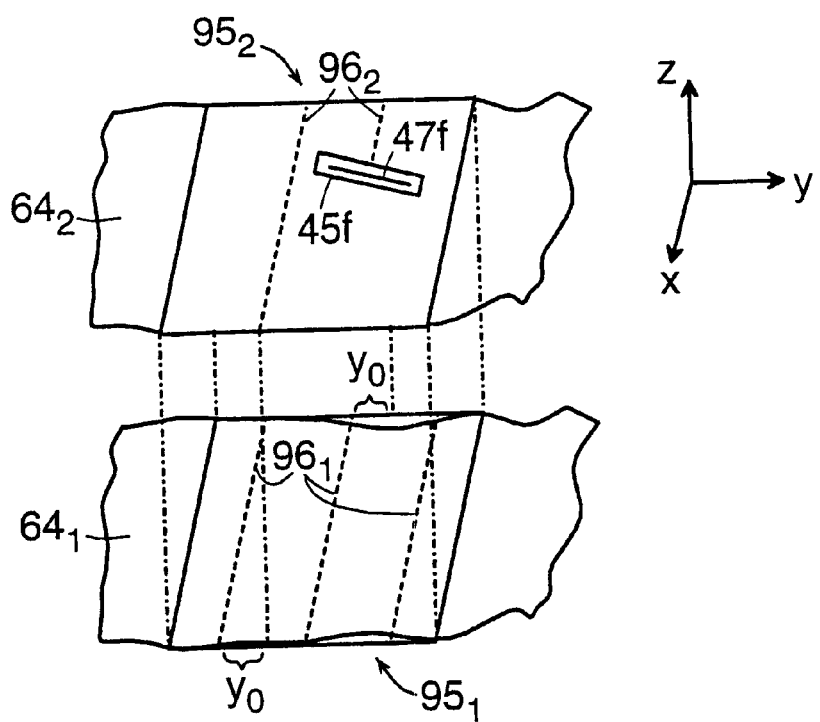
FIG. 10 is a schematic diagram of a method of printing two layers with a faulty binder jet.

FIG. 10 is a schematic diagram of a method of printing two layers with a faulty binder jet. In accordance with the invention, a shingling technique is used to cause the unbound vertical stripes 96-1,96-2 to be placed in different y locations on each layer 64-1,64-2, thereby distributing the areas of weakness throughout the entire part, instead of concentrating them into one plane. Therefore, the faulty jet 47-6 is located at a different y location on each pass relative to every adjacent layer. Shingling with a multiple cartridge system can be accomplished by a slight offset $y_o$ of the cartridge 45 along the y-axis prior to laying each new layer of binder.

It is also desirable to optimize the part strength while maintaining a high build rate. By depositing more binder per unit area, part strength can be improved at the expense of decreasing the build rate. In addition, high binder volume inside a large volume results in part distortion. One method to improve the part strength without a large increase in build rate is to increase the volume of binder as it is applied on the perimeter of each layer, thereby forming a hard shell around the part. This can be achieved by increasing the flow rate when the binder is being applied to the perimeter, or by applying the binder twice to the perimeter of the part. This method has the added advantage that it can control distortion of the interior of the parts.

To optimize the properties of the model, the amount of binder applied per unit area can be adjusted to match both the specific powder type being used and the geometry of the model. Nominally (saturation=1), the printhead applies approximately 1.8 mg/cm$^2$ of binder solution when printing a solid area. The application rate can be reduced below this level (saturation<1) while maintaining the same area scan rate by omitting some portion of the pixels printed. To print at a higher than nominal application rate (saturation>1) the area scan rate can be reduced while maintaining the same flow from the printhead. This can be accomplished by scaling up the bitmap image in the fast scan direction while simultaneously slowing down the fast axis motor proportionately. To obtain a saturation of 1.5, for example, a 180×180 pixel area would be scaled up to 180×270 pixels, and the fast axis velocity would be reduced from 90 cm/sec to 60 cm/sec. Through such a variable saturation technique, the strength of the part can be optimized.

For example, a part can be formed having a strong truss or egg-crate structure in the interior of the part. The remainder of interior can remain as loose powder.

COLOR PRINTING

Color ink jet print heads can be incorporated in the binder cartridge, thereby providing the capability of printing a wide range of colors or ink. Because the system uses these heads to deposit liquid binder, they can be used to deposit a color binder as the material which causes the porous material to bind. In particular, the powder material is white or colorless and can absorb the ink to color the powder. As a result, an embodiment of the invention can build three-dimensional parts which are in color, the color varying throughout the part.

For example, a product designer can produce models of products with various color schemes and decorations already applied to the surface. Such coloring is currently done painstakingly by hand. In addition, a surgeon can prepare for an operation by dissecting a 3-D color-printed model of a patient's body part to become familiar with the three-dimensional arrangement of organs, tumors, blood vessels, etc. Data for the model can be obtained from a Computed Tomography (CT) or Magnetic Resonator Imaging (MRI) scan.

Software can adjust the color ink to use only on the outer edges of each layer, which is the only part ultimately visible to the user after the build is complete. In such a case, a mono-colored binder (e.g., black) is used on the inside of part which is not visible to the user. This conserves color binder which can be more expensive and more cumbersome for the user to obtain for refill. In addition, mono-colored binder may have superior properties and thus make for a stronger core in the parts.

A certain quantity of liquid binder can be deposited into a given volume of powder to produce a well-formed part. Too much binder can result in the binder migrating beyond the intended area of the part. This effect is customarily called "bleeding." Quantities of binder below this certain amount, however, produce progressively weaker parts. It is desirable to use an optimal quantity of binder independent of amount of color. One method for producing parts with controlled variations in color is as follows.

The printer prints onto white powder and has two sets of nozzles. One set of nozzles deposits a black binder, the other set of nozzles deposits white binder, which should be understood to be colorless or clear binder. At each location in the part being built, the two types of binder are deposited in a ratio to produce the shade of gray, white, or black desired in that region of part. All regions of the part thus receive the optimal total amount of binder needed to produce a strong part. Such a technique, however, implies binder jet heads which can produce controlled size droplets.

Although an ink jet print head could be chosen to produce droplets of a controlled range of sizes, most heads work best if they are used to produce droplets of one size only. Thus, if the droplets are distributed uniformly across the layer, each location of the parts cross section is hit by either a black droplet or a clear droplet. These droplets can be distributed in such a manner that when viewed from a sufficient distance a gray is perceived, but when magnified, it is seen as a pattern of dots. Schemes for doing this are known as dithering and halftoning. Traditional methods of dithering and halftoning can be used on each layer to determine where to place the droplets of each binder. Algorithms also exist for dithering and halftoning techniques to determine the optimal placement of droplets that fall on what will be the surface of the finished part.

By adding additional nozzles that deposit other colors of binder, the above schemes can be extended to produce full-color parts.

A problem arises when the quantity of colored binder needed to produce a well-colored part is greater than that needed to produce a well-formed part. In that case a compromise must be made, either in the coloring or among bleeding. If the pigmented liquids do not function as a binder, it is possible to deposit much larger quantities without affecting mechanical properties of the part.

In an ideal world, there are inks of three primary additive colors: cyan, magenta and yellow. Mixing the three primary colors in equal quantities makes black. Mixing any two of equal quantities make the three secondary colors of purple, green and orange. By mixing different ratios of these inks and thinning to white, all possible colors can be made. Real inks, however, are slightly off in hue and vary in brightness. They, therefore, typically cannot be combined to obtain a pure black.

Color printing with real-world inks is done by placing color dots next to each other so that they don't actually mix. The reflected light from the adjacent dots mixes in the eye and creates the illusion of an intermediate color, when seen from sufficient distance. If those same inks were mixed together, they would yield a muddy color. Schemes for arranging colored dots are called color halftoning or color dithering.

It is desirable that the pigments not migrate from an area in which they are placed or mixed with adjacent droplets of a different color. This can be achieved by having the pigments set, coagulate, or come out of solution or suspension by the heating of the build powder. Alternatively, the ink liquids can be made immiscible with the binder and with the other colors of ink. Thus, pigments from the given droplet can only diffuse into another droplet of the same color.

POST-PROCESSING

It is desirable to have strong parts which do not flake when handled and which have the potential to be finished (e.g., sanded, painted or drilled) for a good final appearance. The output from the build chamber 26, however, may have porous parts which can be weak. In addition, the part surface can be rough and flaky. Post-processing techniques 7 (FIG. 1) can be employed to finish the 3-D object prototype 9.

The parts can be dipped or painted with a solution which, through capillary action, infiltrates into the pores of the part. The solution can include a supplemental material, such as an epoxy, a solvent-based material, wax, plastic, urethane, cyanoacrylate or monomers. Once the solution forms bonds between the powder particles, dries and hardens, the resulting part has improved strength. In addition, this process hardens the outer shell, which allows the part to be sanded, painted and drilled. This also allows the part to be handled without powder rubbing off the part, which can be a nuisance to the user and can result in gradual decay of the part.

The dipping process described above can take place in a bath. Parts can be put in a basket with a screen on the bottom and then the basket can be dipped into the bath. When the basket is removed, it is hung over the bath so that the excess solution drips out of the basket and back into the bath. This dipping can occur in a batch or a continuous process.

A preferred solution for part infiltration can be an epoxy or solvent-based system. The epoxy can either be a two-part epoxy or a UV curable epoxy. Alternatively, the solution can be a melted material which melts at a lower temperature than that at which the parts soften. Examples of such melted material include: wax, plastic, rubber or metal. For dipping into a melted material, a part can be placed in a bath which is inside an enclosure where the air temperature is controlled. Parts are put in a basket, heated up in the air and then dipped. They can then be removed and stay warm in the warm air.

The part can also be preheated in the warm air. Preheating the part before dipping into a melted material accomplishes three goals. First, it removes moisture from the part and thereby hardens the part which can reduce the amount of sagging after treatment. Second, it removes moisture from the part which frees up additional volume which can then be infiltrated with the material. This has the result of increasing the final infiltration density in the part and thereby improving part strength. Third, preheating of the entire part prevents the infiltration material from fusing on the outer shell of the part when the part is dipped. When the part is heated, the material can infiltrate much deeper into the part which improves final part strength. Airflow across the part, whether heated or not, also improves spreading by reducing airborne particles. That airflow also accelerates binder drying.

The part can also be freeze dried to remove moisture without altering the structure of the part. Infrared lights above the build chamber can also be used to increase the drawing rate of the binder. This can also improve the overall build rate. In addition, a heated airflow through the build chamber can be used to accelerate binder drawing and possibly control moisture.

Post-heating of the part can also be used and accomplishes two goals. First, it allows draining of trapped volumes as the material inside the trap melts down and out through the bottom of the trap. Second, it improves the service finish by remelting and distributing any excess material that is frozen on the surface of the part.

Double dipping can be accomplished by preheating the part, dipping it, post-heating it and then allowing it to cool. The part is then preheated again, dipped again and post-heated again. This provides a harder outer shell to the part which improves its appearance and handling characteristics. The second dip can be of the same temperature, higher temperature or lower temperature than the original dip. Similarly, the part can be infiltrated, such as with cyanoacrylate, and then coated with wax. Each of these alternatives is expected to have different results on the final part characteristics.

Another method to improve part strength and harden the outer shell is to utilize a multipart hardener. For example, one reactive component of a binary or other multipart system can be mixed with the powder and thereby be spread with the powder in each layer. The second component (and any subsequent components) can be later added through post-process infiltration as described above to harden the shell. Alternatively, one reactive component of a multipart system can be mixed with the binder and thereby laid wherever the binder is deposited.

In accordance with an alternative embodiment of the invention, the part is immersed in a solution in a vacuum chamber. When the vacuum is released, the solution gets sucked into the part.

There are several methods for removing completed parts from the build chamber. One method is to vacuum the unbound particles from around the part and then pick out the part. A caddie can also be used to remove the parts. For example, a box can be placed on top of the build chamber 26, the powder is raised into the box, and then a sheet of metal is slid between the powder and the build table 27. The whole assembly can then be transferred elsewhere for powder removal.

Furthermore, the walls of the build chamber 26 can be belts moving in the vertical directions to reduce shear force against the powder when lifting the powder out of the build chamber and into the caddie.

PISTON BOXES

The feed reservoir 24 and the build chamber 26 both usually contain powdered build material. It is desirable to prevent this powder from falling through the bottom of these piston boxes 24,26, because this could cause problems with the piston mechanism below and could also result in powder accumulation under the boxes. In addition, as mentioned above, any airborne powder can cause a variety of other problems.

The feed piston 25 and build piston 27 are generally rectangular to maximize the feed and build volumes within the constraints of the overall machine dimensions. While it is desirable for design purposes to have rectangular instead of cylindrical pistons 25,27, the feed reservoir 24 and the build chamber 26 can have rounded inside corners to make it easier to form a seal around the pistons 25,27, thereby preventing any powder from falling through the bottom of the piston boxes 24,26. This seal is preferably fabricated from a plastic material and is fixed to the pistons 25,27.

Figure 11:
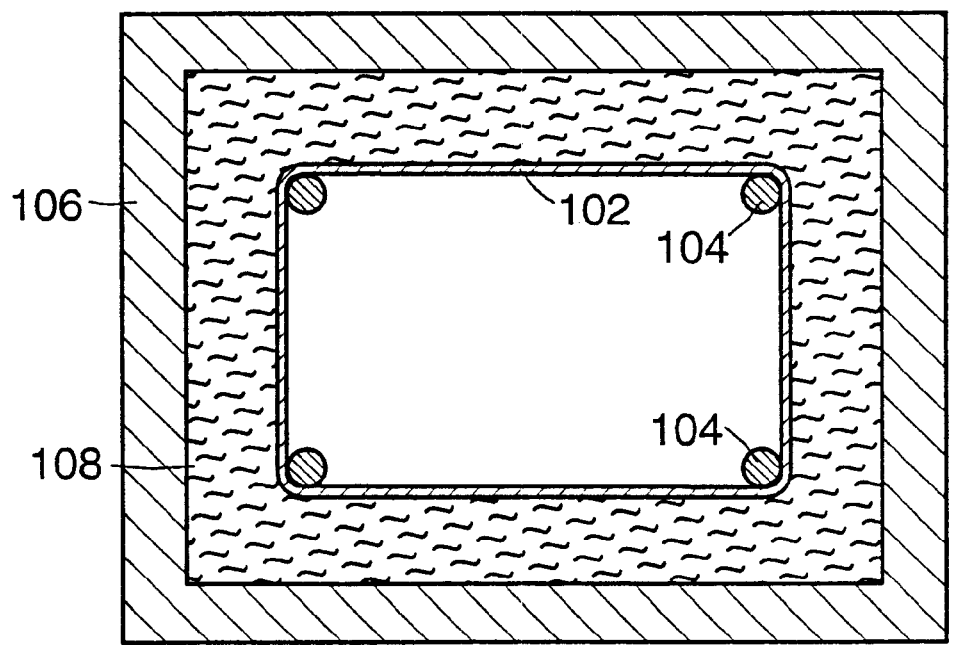
FIG. 11 is a schematic diagram of a technique to fabricate the feed reservoir 24 and the build chamber 26.

FIG. 11 is a schematic diagram of a technique to fabricate the feed reservoir 24 and the build chamber 26. The rounded interior corners can be cut from a section of a thin (e.g., 3–5 mils) unibody sheet metal belt 102 having a circumference equal to the desired circumference of the box interior. A length of the belt 102 is cut to equal the final height of the desired box 24,26. This section of belt 102 is then put around four rods 104 defining the corners of the boxes 24,26. The belt 102 is placed inside of a containing box 106 having sides whose lengths are slightly greater than the distance between the respective rods. Urethane 108 is then poured between the outside of the belt 102 and the inside of the containing box 106. The urethane 108 is left to harden. After the urethane has cured, the rods 104 are removed, thus forming a box with a metal interior, rounded corners and thin walls (about 0.125–0.25 inch).

PRESSURE-CONTROLLED PRINT CARTRIDGE SYSTEM

Figure 12:
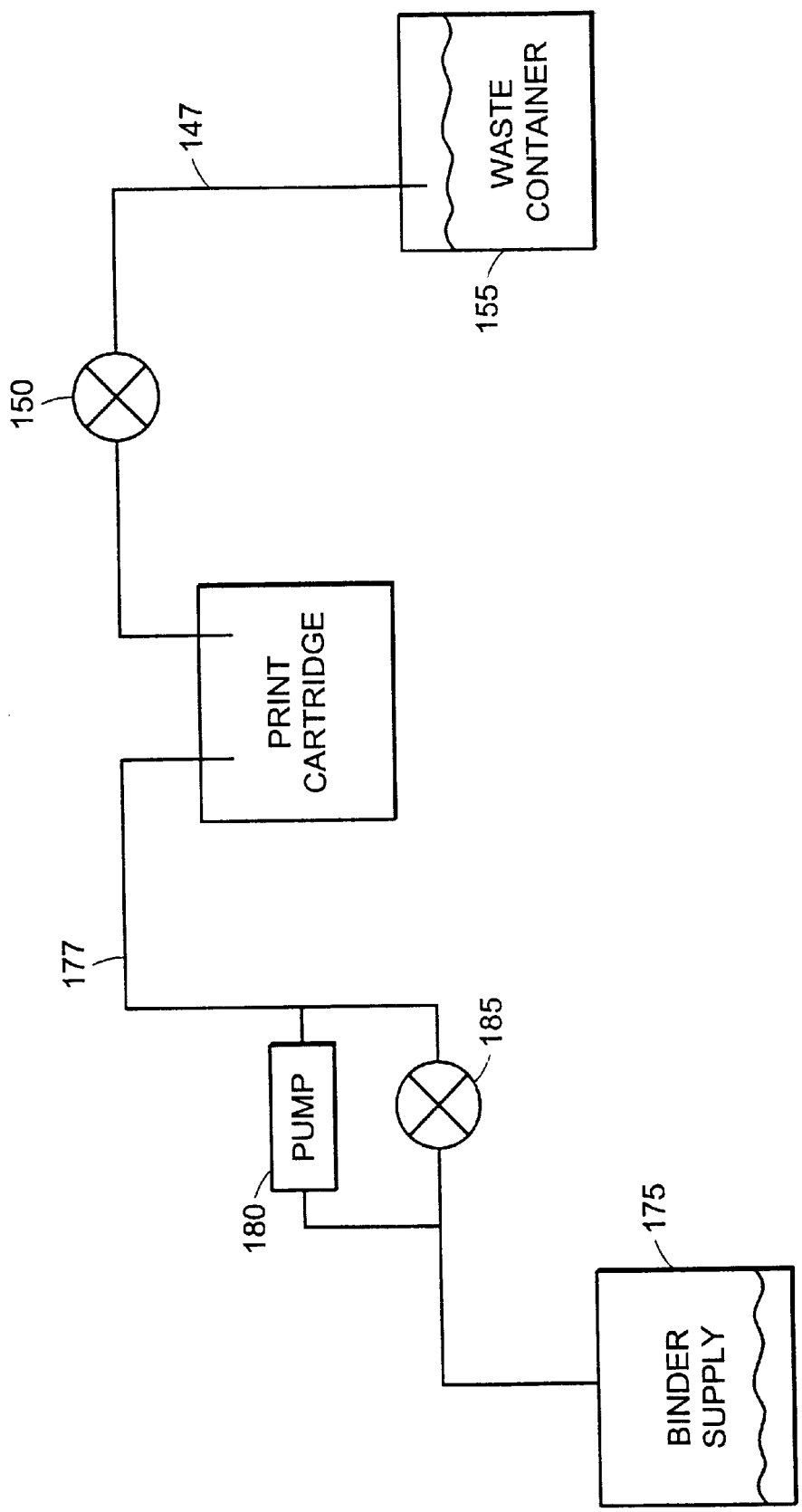
FIG. 12 is a schematic block diagram of a pressure-controlled print cartridge system.

FIG. 12 is a schematic block diagram of a pressure-controlled print cartridge system. As illustrated, a print cartridge 145 is disposed between a binder supply reservoir 175 and a waste container 155. A binder supply line 177 includes a supply pump 180 in parallel with a supply valve 185. A waste valve 150 is disposed in a waste line 147 from the print cartridge 145 to the waste container 155.

To initially prime the print cartridge 145 or to periodically clean the jets, the waste valve 150 is closed and the supply valve 185 is closed. The supply pump 180 pumps binder under pressure through the jets.

To fill the print cartridge 145, the waste valve 150 is opened and the supply valve 185 is closed. The supply pump 180 now pumps binder from the binder supply reservoir 175 to fill the print cartridge 145, with excess binder overflowing into the waste container 155. The print cartridge 145 is now at atmospheric pressure, because it is exposed to the waste container 155.

Thereafter, during printing, the supply valve 185 is opened so the supply line 177 bypasses the pump 180, and the waste valve 150 is closed. As the print cartridge 145 prints binder, this causes negative pressure inside the print head which draws more binder liquid into it.

Although the supply pump 180 and the supply valve 185 are shown as separate components, it should be understood that the supply valve 185 can be a bypass valve integrated within the housing (not shown) of the pump 180. This system allows the print head to be completely filled with binder solution before printing. It also makes it easier to change colors or the binder supply.

EQUIVALENTS

While the method and apparatus for prototyping a three-dimensional object has been particularly shown and described with references to particular embodiments thereof, it will be understood by those skilled in the art that various changes in form and details may be made without departing from the spirit and scope of the invention as defined by the appended claims. These and all other equivalents are intended to be encompassed by the following claims.

We claim:

1. A system for fabricating a three-dimensional object from a representation of the object stored in a memory, the system comprising:

in a work area, a deck having a length along a longitudinal axis and a width along a transverse axis, the deck having a feed aperture, a build aperture and an overflow aperture therethrough it along the longitudinal axis, the overflow aperture having a width greater than the widths of the feed aperture and the build aperture;

a build chamber coupled to the build aperture and a movable build piston bounded by an interior wall;

a feed chamber coupled to the feed aperture and a movable feed piston bounded by an interior wall;

an overflow chamber coupled to the overflow aperture;

a movable gantry suspended over the deck;

a plurality of cleanable binder jets movably coupled to the gantry;

in a clean area a controller in communication with the build piston, the feed piston, the gantry and the binder jets, the controller executing instructions for:

filling the binder jets with a pressure-controlled binder liquid colorable with dyes;

transferring build material from the feed chamber to the build chamber as incremental layers of build material;

variably depositing volumes of the colorable binder liquid at selected positions on each layer of build material, the binder liquid binding regions of the build material together based on cross-sectional representations of the object stored in the memory, the binder jets being offset relative to adjacent layers of build material;

moving a first quantity of waste build material along the deck and into the overflow cavity;

at least a partial seal separating the clean area from the work area; and a mechanism to improve the quality of the fabricated object.

2. An apparatus for fabricating a three-dimensional object from a representation of the object stored in memory, the apparatus comprising:

a feed reservoir having stored therein a supply of build material for forming the object;

a build table for receiving incremental layers of the build material from the feed reservoir;

an overflow cavity for receiving an excess quantity of build material transferred from the feed reservoir but not received by the build table; and a cleaning element movable across the build table to transfer a quantity of build material from the build table to the overflow cavity.

3. The apparatus of claim 2 wherein the build material is a powder which reacts with an applicable binder to form a solid structure.

4. The apparatus of claim 2 wherein the cleaning element is a plow member to inhibit an accumulation of loose build material around the build chamber.

5. The apparatus of claim 2 further comprising:
a plurality of binder jets, each binder jet coupled to a supply of binder solution; and
a control unit for controlling each binder jet to deposit a controlled quantity of the binder solution at controlled locations on each incremental layer of build material.

6. The apparatus of claim 5 wherein the binder jets are arranged in a plurality of binder cartridges.

7. The apparatus of claim 5 wherein the binder jets are further coupled to color additives and the control unit controls the deposit of a controlled quantity of the color additives at controlled locations on a layer of build material.

8. The apparatus of claim 5 wherein the binder jets operate with a pressure-controlled binder solution.

9. The apparatus of claim 2 wherein the cleaning element is coupled to a movable gantry mounted relative to the feed reservoir, the build table and the overflow cavity, the gantry comprising:
a plurality of binder jets coupled to a supply of binder for depositing binder at selected locations on the build material on the build table; and
a cleaning assembly for removing build material from the binder jets.

10. The apparatus of claim 9 wherein the cleaning assembly comprises a wiper element cleanable by a flow of a cleaning solution.

11. The apparatus of claim 10 wherein the cleaning solution is binder and the binder flows from at least one of the binder jets.

12. The apparatus of claim 9 further comprising an abrasive element adjacent to the overflow cavity for removing debris from the gantry.

13. The apparatus of claim 2, further comprising a mechanism to flow air over each layer of build material on the build table.

14. An apparatus for fabricating a three-dimensional object from a representation of the object stored in memory, the apparatus comprising:
a layering apparatus for forming a layer of powder material;
a supply of binder liquid which reacts with the powder material to form a solid structure;
a supply of dyes combinable to create a plurality of perceived colors;
a printing apparatus to deposit the binder liquid and the dyes at selected positions on the layer of powder material, the binder liquid binding regions of the powder material together to form cross-sections of the object; and
a mechanism for operating the printing apparatus with a pressure-controlled binder liquid.

15. The apparatus of claim 14 wherein the supply of dyes include a supply of three primary colors and a supply of black.

16. The apparatus of claim 15 wherein the binder liquid is uncolored.

17. The apparatus of claim 14 wherein the binder liquid includes the supply of dyes.

18. The apparatus of claim 14 wherein the selected positions define an outside surface of the object.

19. The apparatus of claim 14 further comprising a flow of air over the layer of powder material.

20. A method for fabricating a three-dimensional object from a representation of the object stored in memory, comprising:
providing a feed reservoir;
storing a supply of build material for forming the object in the feed reservoir;
on a build table, receiving incremental layers of the build material from the feed reservoir; and
at an overflow cavity, receiving an excess quantity of build material transferred from the feed reservoir but not received by the build table.

21. The method of claim 20 wherein the build material is a powder which reacts with an applicable binder to form a solid structure.

22. The method of claim 20 further comprising providing a plow member to inhibit an accumulation of loose build material around the build chamber.

23. The method of claim 20 further comprising:
providing a plurality of binder jets;
coupling each binder jet to a supply of binder solution; and
controlling each binder jet to deposit a controlled quantity of the binder solution at controlled locations on each incremental layer of build material.

24. The method of claim 23 further comprising arranging the binder jets in a plurality of binder cartridges.

25. The method of claim 23 further comprising:
coupling the binder jets to color additives; and
depositing a controlled quantity of the color additives at controlled locations on a layer of build material.

26. The method of claim 23 further comprising operating the binder jets with a pressure-controlled binder solution.

27. The method of claim 20 further comprising mounting a movable gantry relative to the feed reservoir, the build table and the overflow cavity, the gantry comprising:
a plurality of binder jets coupled to a supply of binder for depositing binder at selected locations on the build material on the build table; and
a cleaning assembly for removing build material from the binder jets.

28. The method of claim 27 wherein the cleaning assembly comprises a wiper element and further comprising the step of flowing a cleaning solution to clean build material from the wiper element.

29. The method of claim 28 wherein the cleaning solution is binder solution flowing from at least one of the binder jets.

30. The method of claim 20 further comprising removing debris from the gantry using an abrasive element adjacent to the overflow cavity.

31. The method of claim 20 further comprising flowing air over the build table.

32. A method for fabricating a three-dimensional object from a representation of the object stored in memory, comprising:
in a work area, housing a fabrication assembly for fabricating the object from a build material, the work area having airborne build material therein;
in a clean area, housing equipment coupled to the fabrication assembly and damageable by the airborne build material;
separating the work area from the clean area with at least a partial seal, there being a mechanical coupling through the seal.

33. The method of claim 32 further comprising circulating air from the work area to the clean area through a filtration system, the filtration system removing the airborne build material.

34. The method of claim 32 further comprising returning the filtered air to the work area through an enclosure having binder jets therein.

35. A method for fabricating a three-dimensional object from a representation of the object stored in memory, comprising:

forming a layer of powder material;

supplying binder liquid which reacts with the powder material to form a solid structure;

supplying dyes combinable to create a plurality of perceived colors; and depositing the binder liquid and the dyes at selected positions on the layer of powder material, the binder liquid binding regions of the powder material together to form cross-sections of the object.

36. The method of claim 35 wherein the dyes include dyes of three primary colors and a black dye.

37. The method of claim 36 wherein the binder liquid is uncolored.

38. The method of claim 36 wherein the binder liquid includes the dyes.

39. The method of claim 35 wherein the selected positions define an outside surface of the object.

40. A method of operating binder jets, including a faulty jet, to fabricate a three-dimensional object from a representation of the object stored in memory, the faulty jet creating an undesired fault line when operated comprising:

applying a binder to a first layer of build material to create a first two-dimensional cross-section of the object in the first layer;

offsetting the binder jets; and applying binder to a second layer of build material to create a second two-dimensional cross-section of the object in the second layer.

41. The method of claim 40 wherein applying comprises:

scanning the binder jets in a first direction across the layers of build material; and offsetting the binder jets laterally relative to the first direction.

42. A method of fabricating a three-dimensional object from a representation of the object stored in memory, comprising the steps of:

forming a layer of build material;

supplying binder which reacts with the build material to form a solid structure; and applying varying volumes of the binder to selected positions in the layer of build material to form a two-dimensional cross-section of the object.

43. The method of claim 42 wherein applying comprises applying a greater volume of binder at the perimeter of the cross-section than in the interior of the cross-section.

44. The method of claim 42 wherein applying comprises varying a flow rate of a liquid binder.

45. The method of claim 42 wherein applying comprises applying binder a variable number of times at the selected positions.

46. A method of fabricating a three-dimensional object, comprising:

forming the object in a three-dimensional printer; and infiltrating the object with a material.

47. The method of claim 46 further comprising flowing air around the object.

48. The method of claim 46 wherein infiltrating comprises introducing a solution of the material into the body of the object.

49. The method of claim 48 wherein the material is selected from the group consisting of epoxy, wax, plastic, solvent-based material, urethane, cyanoacrylate and monomers.

50. The method of claim 48 wherein introducing comprises melting the material.

51. The method of claim 48 wherein introducing comprises freeze drying the object.

* * * * *